US008458915B2

(12) United States Patent
Wahl

(10) Patent No.: US 8,458,915 B2
(45) Date of Patent: Jun. 11, 2013

(54) BLADE HOLDER, PARTICULARLY JOINT PLANE, BLADE AND METHOD FOR SHARPENING AND FINING DOWN A SUBSTRATE

(75) Inventor: Christoph Wahl, Solingen (DE)

(73) Assignee: Mozart AG, Solingen (DE)

(*) Notice: Subject to any disclaimer, the term of this patent is extended or adjusted under 35 U.S.C. 154(b) by 373 days.

(21) Appl. No.: 12/809,801

(22) PCT Filed: Dec. 18, 2008

(86) PCT No.: PCT/EP2008/067850
§ 371 (c)(1),
(2), (4) Date: Jun. 21, 2010

(87) PCT Pub. No.: WO2009/080690
PCT Pub. Date: Jul. 2, 2009

(65) Prior Publication Data

US 2010/0266359 A1 Oct. 21, 2010

(30) Foreign Application Priority Data

Dec. 21, 2007 (DE) ......................... 10 2007 062 842
Jun. 5, 2008 (DE) ......................... 10 2008 026 966

(51) Int. Cl.
*B23D 1/08* (2006.01)
*B23D 9/00* (2006.01)
*A47L 13/08* (2006.01)

(52) U.S. Cl.
USPC .................... 30/337; 30/169; 30/338; 30/339

(58) Field of Classification Search
USPC .................... 30/330, 331, 339, 169, 337, 338
See application file for complete search history.

(56) References Cited

U.S. PATENT DOCUMENTS 586,164 A * 7/1897 Denere .......................... 30/169
952,697 A 3/1910 Billau
1,667,061 A * 4/1928 Strickland ...................... 30/151

(Continued)

FOREIGN PATENT DOCUMENTS

DE 19724975 12/1998
DE 102007017562 9/2008

(Continued)

OTHER PUBLICATIONS

PCT International Search Report dated Dec. 11, 2009, received in corresponding PCT Application No. PCT/EP2008/067850, 5 pgs.

(Continued)

*Primary Examiner* — Hwei C Payer
(74) *Attorney, Agent, or Firm* — Grossman Tucker Perreault & Pfleger, PLLC

(57) ABSTRACT

A blade holder for smoothing and planing off a substrate comprising a handle, a receiving means including a receiving space for a blade, wherein the blade has a larger blade side surface and a narrow side which is at the rear in a cutting direction and which has a cutting edge, and a positioning aid for positioning the blade holder relative to the substrate, wherein the positioning aid includes a spacer device, by means of which the blade can be arranged in a spaced position in the receiving means in such a way that it can be positioned in spaced relationship with the substrate with its cutting edge for processing the substrate. A method and a blade for the blade holder are also provided.

39 Claims, 8 Drawing Sheets

U.S. PATENT DOCUMENTS

Figure 1:
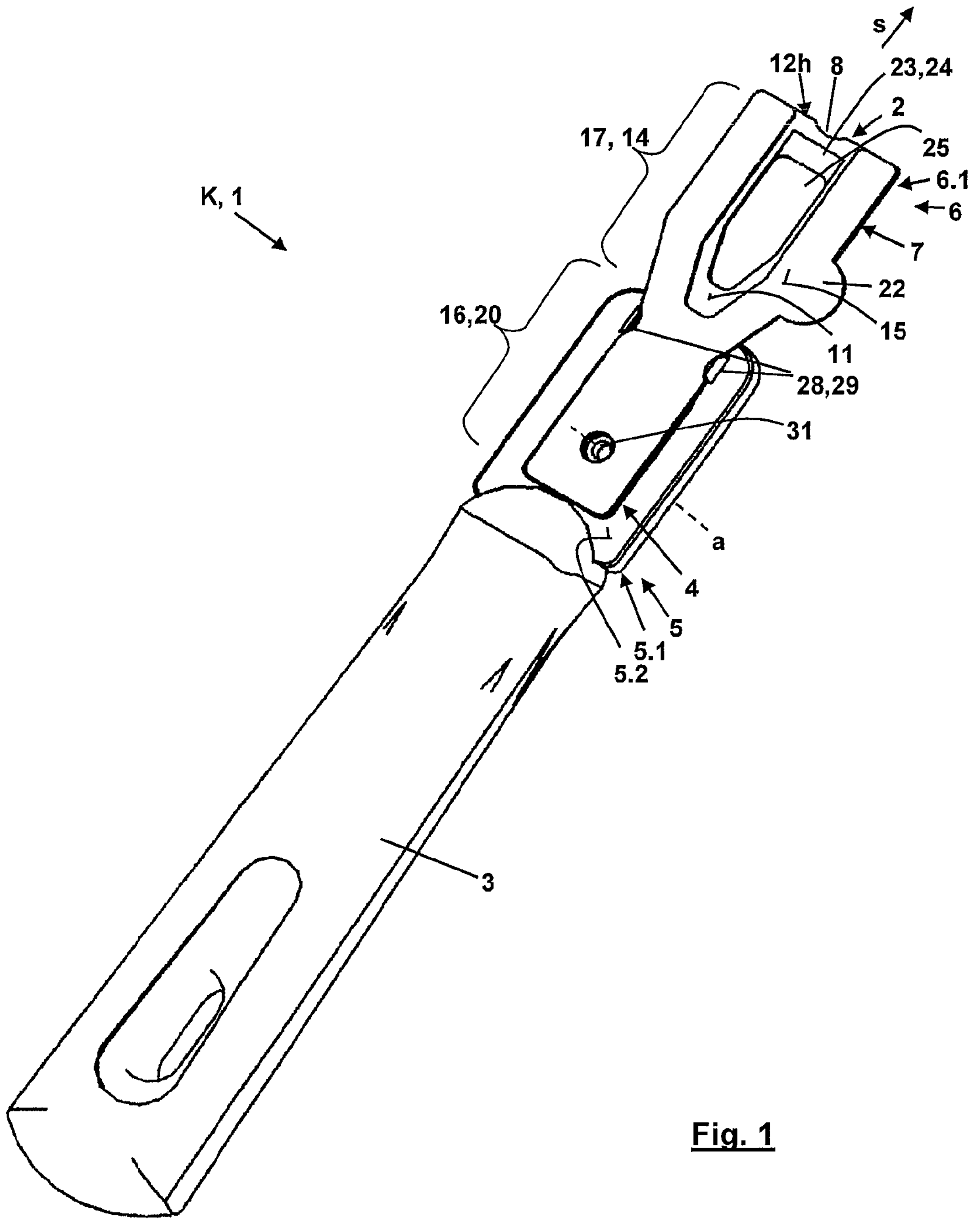

| | | | | | |
|---|---|---|---|---|---|
| 1,754,650 | A * | 4/1930 | Seaholm | 30/337 |
| 3,670,414 | A * | 6/1972 | Stecker | 30/338 |
| 3,899,828 | A * | 8/1975 | Bosco | 30/151 |
| 3,924,329 | A | 12/1975 | Carter | |
| 4,531,286 | A * | 7/1985 | Vito et al. | 30/2 |
| 4,598,476 | A * | 7/1986 | Grasse | 30/169 |
| 5,480,507 | A * | 1/1996 | Arnold | 156/714 |
| 6,351,888 | B1 | 3/2002 | Brown et al. | |
| 2009/0265940 | A1* | 10/2009 | Wahl | 30/169 |
| 2010/0266359 | A1* | 10/2010 | Wahl | 409/293 |

FOREIGN PATENT DOCUMENTS

| | | | |
|---|---|---|---|
| DE | 10 2008 026 966 | * | 6/2009 |
| GB | 2290102 | | 12/1995 |
| JP | 57086319 | | 5/1982 |
| JP | 3035145 | | 4/1991 |
| JP | 3046649 | | 4/1991 |

OTHER PUBLICATIONS

German Search Report dated Apr. 2, 2009, received in corresponding priority Application No. DE 10 2008 026 966.2, 4 pgs.

Translation of the International Preliminary Report/Written Opinion dated Aug. 10, 2010 received in corresponding PCT Application No. PCT/EP2008/067850, 12 pgs.

* cited by examiner

Fig. 4
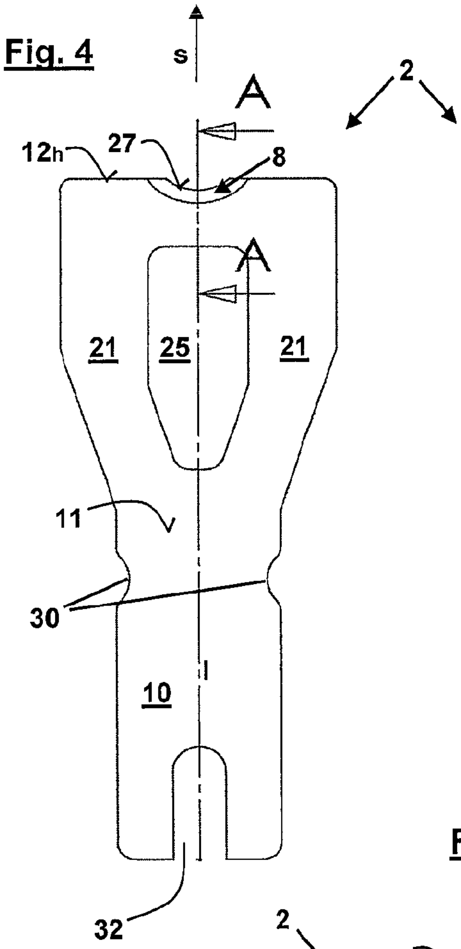
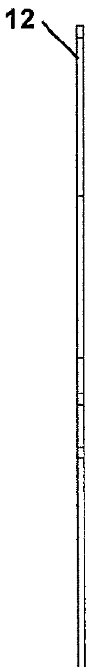
Fig. 6a
Fig. 5
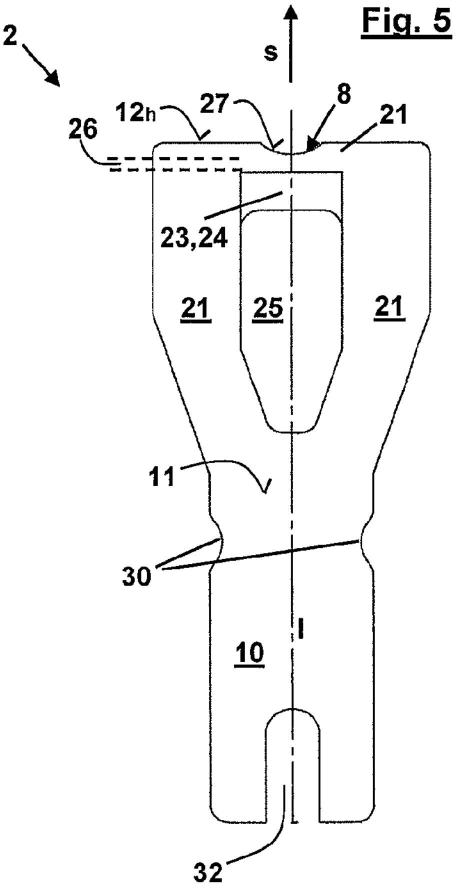
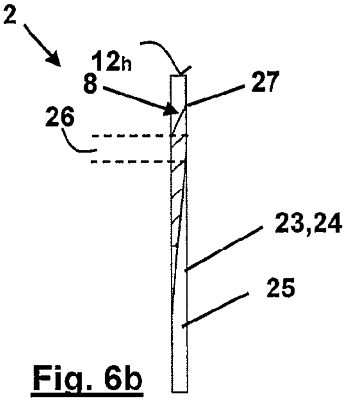
Fig. 6b

BLADE HOLDER, PARTICULARLY JOINT PLANE, BLADE AND METHOD FOR SHARPENING AND FINING DOWN A SUBSTRATE

CROSS-REFERENCE TO RELATED APPLICATIONS

This application is a U.S. 371 national stage completion of international application no. PCT/EP2008/067850 filed Dec. 18, 2008 (published as WO 2009/080690 on Jul. 2, 2009) designating the U.S., and which claims priority to German patent application serial no. DE 10 2008 026 966.2 filed Jun. 5, 2008 and German patent application serial no. DE 10 2007 062 842.2 filed Dec. 21, 2007, the teachings of which are incorporated herein by reference.

The invention concerns a blade holder, in particular a join plane, comprising a handle, a working end having a receiving means including a receiving space for a blade for fixing the blade to the join plane, wherein the blade has a larger blade side surface and a narrow side which is at the rear in a cutting direction and which has a cutting edge, and a positioning aid for positioning the blade holder relative to the substrate, wherein the positioning aid includes a spacer device, by means of which the blade can be arranged in a spaced position in the receiving means in such a way that in the spaced position it can be positioned in spaced relationship with the substrate with its cutting edge for processing the substrate. The invention further concerns a blade for the join plane and a method of smoothing and planing off a surface of a substrate.

For example when laying floor coverings, when the coverings are generally welded at their lateral edges using a welding additive, projecting portions or raised portions occur at the weld seam, which are subsequently cut off, smoothed off or planed off by means of a blade or a blade holder with a blade. Usually for that purpose use is made of a blade holder in the form of a so-called half-moon blade, with a cutting edge which is arranged at a narrow side and which extends longitudinally approximately over a quarter circle. It is usual in that respect for the welded seam to be smoothed off twice, by a procedure whereby firstly a generally thicker layer is smoothed off by means of an additional slider and then a thinner layer is smoothed off alone by means of the half-moon blade. The procedure with the half-moon blade is dangerous and complicated.

Therefore the object of the invention is to provide a join plane of the kind set forth in the opening part of this specification, by means of which smoothing of projecting portions of a substrate is possible more easily and less dangerously.

According to the invention the specified object is attained by the foregoing blade holder and in particular in that the spacer device has a spacer element, the spacer element is arranged in positionally variable relationship with the receiving means on the join plane and the spacer element is movable between a working position for holding the blade in the spaced position and a readiness position for holding the blade in the receiving means in a contact position in which the blade can be placed against the substrate for processing same at least with a region having the cutting edge.

In that case the join plane, with the blade inserted in the receiving space can be guided over the substrate for cutting off projecting portions protruding from the substrate in the spaced position and in the contact position in such a way that the blade is cuttingly effective in a plane parallel to and above the surface of the substrate and just above the surface of the substrate respectively. For that purpose, as described hereinafter, the blade can be flexibly bent by a pressure force against the substrate so that it is arranged in parallel spaced relationship with the substrate in the spaced position with a region which is at the rear in the cutting direction and which has the cutting edge, and in the contact position it bears flat against the substrate. The spacing of the blade from the substrate is at the same time a measurement of the height of the projecting portions, from which they can be cut off by the blade. That is the case for example when smoothing off joining seams of floor coverings, which protrude above the surface of the floor covering. It will be appreciated that specific blades, that is to say which are appropriately adapted, can be used for the join plane to be able to achieve an optimum in terms of cutting efficiency. Thus the receiving space can be so adapted to blades to be used that the blade in the receiving space bears against the elements which are still to be described hereinafter and which delimit the receiving space, like the spacer element, and can thus be securely fixed in the receiving space. Thus displacement of the join plane according to the invention over the substrate for smoothing and planing it off can be effected with one hand. A user can therefore support himself for example with his hand which is then free, and can thus work more securely.

Preferably the spacer element in its working position covers over the receiving space in the cutting direction at an underside which in the position of use of the join plane is towards the substrate to such an extent that the blade positioned in the receiving space can only project with the cutting edge or a cutting edge portion with the cutting edge in the cutting direction or the cutting edge or the cutting edge portion with the cutting edge remains unconcealed towards the substrate. In that way the blade can be supported over almost its entire extent in the cutting direction by the spacer element. The blade can therefore be stabilised by the spacer element. That is advantageous for example when in particular projecting portions which are irregularly distributed over the substrate are to be cut off and thus the cut can be effected from the point of view of the working procedure in a dangerous fashion in a more jerky or discontinuous manner over a cutting travel. By virtue of stabilisation of the blade by the spacer element it is possible to increase working safety in relation to such dangerous cutting events.

The spacer element can be flexibly bent in the working position in the same manner as the blade which can be inserted in its spaced position and in its contact position. In that way the receiving space delimited by the spacer element for the blade and a blade fitted in the receiving space can be bent in a corresponding fashion with the bend of the spacer element. By virtue of the bending effect the spacer element can remain in contact against the blade at least with an end portion which is preferably at the rear in the cutting direction and in that way can support same and cover it at least partially downwardly. The blade fitted in the receiving space can be supported over its entire bend by means of the spacer element and, in the spaced position of the spacer element, can be held in spaced relationship with the substrate. The blade can thus be held in positionally stable relationship over its bend in the receiving space by the spacer element. It will be appreciated that the cutting edge in itself is preferably kept free for its cutting operation over the bend of the blade and of the spacer element or can be exposed for the cutting operation.

Equally the spacer element in its readiness position can liberate the receiving space at its underside in such a way that at least the part of the receiving space, which is provided for the region that is at the rear in the cutting direction with the cutting edge, is open downwardly in the position of use of the join plane. In that way the blade can be exposed with its rear region for cutting use thereof. At least further regions of the blade can remain supported downwardly by the spacer element in the readiness position thereof.

In the contact position the blade fitted into the receiving space can be caused to bear directly against the substrate with its larger side surface which is downward in the position of use, in at least one cutting region, having the cutting edge, of the rear region. In dependence on the spacing of the cutting edge portion of the cutting edge from the larger side surface of the blade, cutting by the blade can be effected directly at or just above the surface of the substrate.

As is known, because of a reduction in mechanical stresses as a consequence of the cutting operation when cutting off a plastic weld seam, in a cut just above the surface of the substrate, the then minimal seam projecting portion is generally retracted so that, in spite of the projecting portion of the seam, it is possible to achieve a smooth surface.

For that purpose the blade can be bent about a bend axis perpendicularly to the cutting direction and parallel to a cutting plane in which the blade is cuttingly effective. That bending is preferably effected in the region of the blade, that is at the rear in the cutting direction and that has the cutting edge and with which the blade projects beyond the receiving means in the cutting direction in the readiness position of the spacer element.

The receiving space of the join plane is preferably of such a configuration that the blade which can be held in the receiving means is arranged with its cutting edge at least with a component of its longitudinal extent perpendicularly to the cutting direction. Preferably the blade can be positioned in the receiving space in such a way that its cutting edge is arranged in mirror image symmetrical relationship in the join plane with respect to the longitudinal direction as the axis of mirror image symmetry. Preferably the longitudinal direction and the cutting direction coincide.

Thus smoothing and planing off a surface of a substrate by means of a join plane with an embodiment described in the application can be effected in such a way that in a first step of smoothing the substrate, in which the spacer element is positioned in the working position and the blade is held by means of the spacer element in the spaced position, the projecting portions on the substrate are cut off as far as residual projecting portions. After the termination of the first smoothing operation the spacer element can be moved out of the working position into the readiness position in which the blade can be guided over the surface at least with the rear region bearing against the surface. A second operation of smoothing off the substrate can then be effected, in which the blade cuts off the residual projecting portions preferably as closely as possible to the surface of the substrate. Desirably the spacer element can then be moved back into its working position in order again to be ready for a first smoothing operation and to protect the blade in the receiving means and to stabilise it.

The receiving space can be adapted in respect of its cross-section transversely to the cutting direction to the cross-section of the blade intended for the join plane.

The receiving means can have a receiving portion fixedly connected to the join plane. Preferably the receiving portion adjoins the handle. The receiving portion can have a receiving surface which delimits the receiving space. The receiving surface can be arranged in opposite relationship to the spacer element with respect to the receiving space. The receiving space can be of such a configuration that the blade is held with its blade side surface against the receiving surface in the receiving space so that the blade can be securely arranged between the receiving surface and the spacer element in the receiving means. The spacer element can be arranged parallel to the receiving surface in positionally variable relationship with the receiving means on the blade holder.

In a preferred configuration of the join plane the spacer element can be arranged pivotably movably with a pivot axis perpendicularly to the receiving surface on the join plane.

The spacer element can be of a flat elongate shape with a large side surface. The spacer element can thus be of a similar shape to a blade. Advantageously the spacer element at least in the working position can bear flat against the blade in the receiving space and thereby effectively support same. Preferably the pivot axis is arranged perpendicularly to the large side surface in an end portion of the spacer element, that is in the form of a holding portion.

In the working position the spacer element can project with an end in the form of a support portion for supporting the blade in the cutting direction beyond the receiving means.

The spacer element can be of such a configuration that in the working position it is flexible under a pressure loading acting on the support portion in the direction of the pivot axis at least with its support portion about the axis, perpendicularly to the pivot axis and perpendicularly to the cutting direction. In that way in the working position the spacer element can be flexibly bent under for example manual counteracting pressure applied by a user towards the substrate so that it bears preferably flat at least with an end portion of its side surface of the support portion, that in the position of use of the join plane faces towards the substrate. With a similar flexible configuration for the blade, in the working position of the spacer element, they can therefore both be bent in conjunction with each other so that the blade always remains supported by the spacer element or the spacer element remains in constant flat contact against the blade. In that way in the spaced position the blade can be displaced over the substrate in operative cutting relationship therewith, with its cutting edge parallel to the substrate.

The positioning aid can include an abutment device for the blade and/or the spacer element, by means of which the blade which can be fitted into the join plane and/or the spacer element can be held in a given bend position or bend angle relative to the substrate. As stated the join plane can be so designed that the inserted blade can be caused to bear flat against the substrate for cutting off projecting portions, at least with its rear region. A cutting action on the part of the blade can be further optimised by means of holding the blade in a given fixed bending position over the cutting operation. In addition it is possible to increase the level of working safety.

Preferably the abutment device has an abutment element which delimits the receiving space in the bend position in the position of use of the join plane at the side remote from the substrate. In that way a blade fitted in the receiving space can be pressed by way of the bending thereof against the abutment element into the bend position and held in that position without any problem. That counteracting pressing effect can be effected by pressing the blade against the substrate. After the conclusion of the cutting operation, that is to say with the termination of pressing the blade against the substrate, the blade can move elastically back into its starting position. The abutment device can include means, preferably latching means, for fixing the blade in the bend position in which the blade is pressed against the abutment element.

The abutment device can include a fixing device for fixing the blade or the blade and the spacer element in the bend position defined by the abutment element. Preferably the fixing device has latching elements for fixing the blade or the blade and the spacer element in the bend position defined by the abutment element.

The abutment element can be fixed with a securing end to the join plane. Desirably the abutment element is arranged at the side remote from the substrate in the position of use of the join plane, or at the side remote from the spacer element. The abutment element can be fixed to the join plane in a similar manner to the spacer element and/or the blade.

Preferably, the same receiving means is provided for the abutment element as for the spacer element and/or for the blade. In that respect the securing end can have a longitudinally axial slot or a through opening for receiving the pivot axis. It is possible to provide for pivotability of the abutment element in order for example to allow a further abutment element above the pivotable one to be operative in abutting relationship. That can be designed to engage another point or region of the blade and/or to delimit the receiving space. It can be designed to alter the bend of the blade bearing against the abutment element, in the bend position.

Preferably there is provided releasable fixing of the abutment element, which allows interchangeability of the abutment element. In that way an abutment element adapted for example to the blade and/or the substrate can be mounted to the join plane. The abutment element can have an abutment end which extends with a travel component in the cutting direction towards the receiving space. For that purpose a series of appropriate embodiments of the abutment end is possible, like an arcuate, step-like or box-like shape. A cranked shape is preferred.

The abutment end can be of a U-shaped configuration with two abutment limbs extending to the receiving space. In the working position the blade and the abutment element are preferably so positioned relative to each other that cuttings planed off by the blade can be passed through the intermediate space between the abutment limbs and carried away. For more easily carrying the cuttings away the transverse leg at the side surface that is towards the intermediate space can be of a bevelled configuration so that at that location the intermediate space is preferably linearly narrowed towards the receiving space. Like the spacer element, the transverse leg of the abutment element can be prolonged in a tongue-like configuration in opposite relationship to the cutting direction to afford the securing end. In the case of a cranked configuration that can be provided as a prolongation of the transverse leg.

The abutment element can be adapted to be variable in position. In that respect the abutment element can be telescopic. It may have two telescopic members which are slidable one within the other.

In the readiness position the support portion can completely or substantially clear the receiving space at its underside. That can be effected by the spacer element in the readiness position being arranged pivoted at an angle of greater than zero relative to the cutting direction in such a way that its support portion projects laterally from the receiving space. The angle can be of a value of between about 20° and 130°. Advantageously for easy handling of the join plane the angle is between about 30° and 60° or about 40° and 50°. The blade which is thereby liberated to the same extent can be correspondingly easily flexibly bent in the receiving means in such a way that it can be caused to bear flat against the substrate to achieve its contact position with at least the region that is at the rear in the cutting direction, with the cutting edge, of its side that is towards the substrate in the position of use.

Preferably the spacer element extends in the plane of its large side surface and perpendicularly to the cutting direction at least as far as a lateral edge delimiting the receiving space. In that way the blade fitted in the receiving means, effectively covered in the transverse direction, can be mounted safe from injury by a lateral sharp-edged narrow side of the blade as in that way that narrow side can merge with the narrow side of the spacer element. The blade can be shielded by means of the spacer element preferably laterally projecting beyond the lateral narrow side of the blade.

To provide a pivotal connection for the spacer element there can be provided a rotationally movable rotary element which is preferably fixed to the spacer element and is rotationally movably connected to the join plane, in particular to the receiving means. In that respect the rotary element can at the same time form the pivot axis. Preferably the rotary element can extend from the lower side surface of the spacer element, that delimits the receiving space, through the receiving space, and be rotationally movably mounted at an opposite upper side wall of the receiving means, that delimits the receiving space. In that case the rotary element can be arranged to be guided by the receiving space in such a way that at the same time it engages through an opening or a securing slot of a blade mounting in the receiving means and thus secures or fixes it in the receiving means at least with respect to one direction in space. By virtue of that measure the blade can be supported by the spacer element in the working position thereof and can be partially supported in the readiness position. The rotary element can be a screw, preferably a knurled screw which is or can be fixed to the spacer element and/or the receiving means. Preferably the rotary element is in the form of a rotary pin.

Known solutions are considered for constituting the rotationally movable support. A solution which is preferred as it is simple is rotationally movable riveting of the rotary pin to the upper side wall of the receiving means. A releasable connection such as a screw connection can advantageously be provided. In that way for example the spacer element can be easily exchanged or replaced by a spacer element adapted to a modified blade. It can also be adapted to user-specific peculiarities such as left-handedness, insofar as, released from the join plane and rotated about its longitudinal axis through 180°, it is then joined to the join plane again.

In a simple structure and for ease of handling the join plane can include an elongate body having a working end having the receiving means and the handle in the form of a handle grip. Preferably the spacer element is arranged pivotably movably on the working end. In this case in a rest position of the join plane in which the join plane is mechanically non-loaded the cutting direction can face from the handle end towards the working end in the longitudinal direction of the body. In that way a force applied to the join plane by a user can be transmitted to the blade in the optimum fashion.

In the working position of the spacer element the join plane can be of a substantially mirror-image symmetrical configuration relative to a central longitudinal sectional plane having the pivot axis, as the plane of mirror-image symmetry.

The spacer element can be of an elongate shape involving a U-shaped contour. In that case the spacer element can include two limbs which extend in the cutting direction in the working position and form the support portion, and a transverse leg which connects the limbs and forms the holding portion. Preferably the transverse leg is prolonged in a tongue-like configuration in opposite relationship to the cutting direction. The resulting contour shape can be described as a Y-shape.

The spacer element can be adapted to be fixed in the working position on the join plane or the receiving means respectively, which facilitates safe working with the join plane. As described above that fixing effect can be implemented firstly by the rotary pin forming the pivot axis, wherein the rotary pin is preferably arranged in the end portion of the transverse leg, that extends in opposite relationship to the cutting direction.

Preferably the spacer element is adapted to be variable in length in respect of its longitudinal extent. In that way it can be adapted to provided blades and/or substrates to be planed off. Preferably the spacer element has members which are telescopic in the longitudinal direction. Preferably the members are of such a configuration and are so arranged in the join plane that the support portion is formed by means of a member which can be telescoped out of the holding portion.

Additionally or alone, if for example translatory variability in position of the spacer element on the join plane is provided, spring-like latching elements laterally delimiting the receiving space can be provided at the receiving means. Those latching elements can bear laterally against the spacer element in the working position thereof. Preferably the latching elements are disposed in mutually opposite paired relationship with respect to the receiving space. Preferably the latching elements are arranged spaced relative to the pivot axis in the cutting direction. Preferably there are two latching elements which in respect of their arrangement relative to the receiving space form a triangle with the pivot axis, wherein the latching elements are arranged at one height in relation to the cutting direction.

The latching elements can be in the form of clip-like leaf springs which are preferably bent about a bend axis parallel to the cutting direction and towards the center of the receiving means. Accordingly upon pivotal movement of the spacer element towards the receiving space the latching elements exert a substantially lower spring force to that pivotal movement than a pivotal movement of the spacer element away from the receiving space so that the spacer element can be latched in its working position.

Due to the bending of the spring elements, the spacer element in its working position and the blade arranged in the receiving space, which in the processing position can be arranged in mutually superposed coincident relationship and bearing against each other, can be engaged thereover in a clip-like manner and thus securely held. In the readiness position the spacer element is preferably displaced or pivoted with respect to latching elements to such an extent that the latching elements are released from the spacer element. The latching elements can be so positioned in the readiness position that they are not held by the latching elements nor do they contact them or cover them over so that the blade can be easily lifted out of the latching connection and removed from the receiving space, or inserted into the receiving space and latched with the latching elements. Preferably, provided laterally on the spacer element and at the height of the spring elements are recesses into which the latching elements latchingly engage in the working position of the spacer element. The blade can have recesses of identical configuration, which in the working position can be arranged in coincident relationship with those of the spacer element.

For easy manual actuation of the spacer element there can be provided a handling portion projecting laterally on the support portion. That handling portion can be of an ear-shaped or tab-shaped configuration. It can project laterally out of the receiving means in the working position. The join plane can thus be held in the hand of a user in such a way that it is supported with the handle at the end on the inside in the palm of the hand and with its working end projects in the cutting direction preferably away from the body of the user and thus approximately as a prolongation of the arm of the user. Desirably the handling portion is then so positioned that it faces towards the thumb of the hand. In that way the handling portion can be actuated by means of the thumb of the hand which at the same time holds and guides the join plane so that one-handed operation of the join plane is possible. The user can therefore for example support himself with his other hand. That can thus ensure fast safe working with the join plane.

Enhancing working safety, the handling portion can be marked in color and/or can have a surface structure which differs from the join plane, such as for example knurling. Since, as described above, the spacer element can be releasably connected to the join plane or to the receiving means, same can be fixed to the join plane in such a way that it laterally projects out of the receiving means at the left or the right, with the handling portion, with respect to the cutting direction. In that way the join plane can be set up selectively for one-handed operation for left-handed or right-handed people. Preferably the spacer element is pivotable at both sides in its angle relative to the cutting direction from its working position into its readiness position. For that purpose the handling portion can be provided on both sides on the spacer element. In that way the spacer element can be suitable equally for left-handed and right-handed people without additional measures.

The handling end can be in the form of a handling grip. The handling grip can be of an ergonomic configuration and can be adapted in particular for support in opposite relationship to the cutting direction in the inside palm of the hand of a user. In particular the handling grip can have a profile with profile side surfaces which preferably face in opposite relationship to the cutting direction.

In addition, for smoothing off a surface of a substrate or a floor covering, in an easier and less dangerous fashion, there is proposed a blade for a join plane in accordance with one of the above-described embodiments. The blade can have a flat blade body with large blade side surfaces and narrow sides joining the blade side surfaces, and a cutting edge arranged at a narrow side which is at the rear in the cutting direction.

A relief ground configuration applied in front of the cutting edge in the cutting direction, in the blade side surface that is towards the substrate in the working position of the blade, is viewed as a particular advantage. The relief ground configuration can thus be arranged in a cutting sequence behind the cutting edge. That relief ground configuration means that a recess can be provided in the blade side surface. That can provide that the friction of the blade against the substrate and thus the force necessary for displacing the join plane over the substrate are reduced. In addition that makes it possible to provide that when working a substrate which is smooth in itself, the blade clings 'sticking' thereto. If the cutting edge extends only over a central region of the rear narrow side, then as a consequence of the reduced frictional force in relation to the relief ground configuration, higher frictional forces can occur in the edge regions of the narrow side, which can have a centering action in respect of the cutting direction.

The recess can directly adjoin the cutting edge in the cutting direction. To achieve a greater mechanical stability for the cutting edge the recess can be arranged spaced by a small distance relative to the cutting edge. The greater the distance, the correspondingly more stable is the blade in that region. The recess can extend over the entire length of the blade in opposite relationship to the cutting direction.

It can be provided that the recess increases in opposite relationship to the cutting direction in depth and/or in width perpendicularly to the cutting direction. That makes it possible to take account of the fact that material of the covering which was compressed by the pressure with which the blade can be pressed against the surface can elastically spring back into the recess in a time-governed process, without coming to bear against the recess, or by virtue of it bearing with a reduced pressure force against the bottom of the recess. In that way the necessary pressing force can be further reduced and operation with the join plane can be made safer.

Preferably the recess increases linearly, which in terms of production engineering can be implemented more easily by grinding.

To further reduce the friction a through opening can be provided perpendicularly to the side surface of the blade. The large side surface which is towards the substrate in the position of use is reduced thereby. In addition, cutting residues which at the outset have passed under the blade can be conveyed away by way of the through opening. Preferably the underground configuration or the recess opens laterally into the through opening in opposite relationship to the cutting direction. Both measures can thus reduce static and sliding friction of the lower side surface of the blade. In addition that makes it possible to reduce a material-specific moment of resistance which is dependent on geometrical dimensions and which opposes bending of the blade about a bend axis in the cutting plane and perpendicularly to the cutting direction. In addition it is possible at least to an increased extent to prevent bending being effected in the region of the blade in the cutting direction behind the through opening. It is even possible specifically to effect primary bending in the region of the blade with the through opening. The through opening can be in the form of a slot which preferably extends in the cutting direction.

The cutting edge of the blade can be straight. Preferably the cutting edge is of a curved configuration. In that case the cutting edge can be of a sickle-shaped configuration and can preferably extend concavely into the blade body. Similarly as in the case of plain cylindrical grinding of a cutting edge, in this case also the cutting capability of the cutting edge can be increased. The cutting edge can be disposed in the blade body in a protected condition by virtue of its concave arrangement.

Preferably the cutting edge is of a mirror-image symmetrical configuration with respect to its cutting direction and/or its cutting plane. The cutting edge can be arranged transversely in respect of its longitudinal extent and in mirror-image symmetrical relationship with the cutting direction in a central region of the rear narrow side.

By virtue of the sickle-like configuration and the symmetrical arrangement of the cutting edge, the effect can occur when cutting in the cutting direction that the blade centers itself to a straight-line cutting configuration. Cutting forces act perpendicularly towards the longitudinal axis of the blade from the outer edges of the cutting edge towards the central region of the cutting edge, the cutting forces decreasing towards the center. Because of the symmetrical configuration of the blade those forces are equal in mirror-image symmetrical relationship perpendicularly towards the longitudinal axis and cancel each other out when the blade is displaced exactly in the cutting direction. If they depart from that symmetry for example due to a change in the cutting direction, then they are greater on one side of the cutting direction than on the other side and are thus added to afford a correction force which exerts a force impulse on the blade for orientation of the longitudinal axis of the blade in the cutting direction. That self-centering of the cutting edge or the blade in the cutting direction promotes one-handed working with the join plane. It is possible to achieve safe working with the blade or with the join plane.

The central region of the narrow side with the cutting edge can be arranged displaced into the blade body by a distance in opposite relationship to the cutting direction from the rear narrow side. The blade therefore does not dangerously project and can be laterally protected by the remaining rear narrow side. In addition the position and length of the cutting edge can be so defined by the first portion that it can be exactly dimensioned for the desired situation of use. In that case also only one ground region of the central region can also be ground in relation to the cutting edge and if necessary, that is to say when dealing for example with wider weld seams, can be adapted to the wider weld seams by increasing the width of a ground region. Preferably the cutting edge extends over the entire central region.

The blade can be of an elongate shape with a cutting portion having the cutting edge and a holding portion. Preferably the recess extends in opposite relationship to the cutting direction over the cutting portion or at least the part of the cutting portion, which with bending of the blade for bearing against the substrate comes to bear against the surface thereof.

The blade can be of a mirror-image symmetrical structure with respect to a longitudinal center line extending in the cutting direction. In that case the cutting portion can be of a substantially triangular shape, wherein a side of the triangle which is at the rear in the cutting direction forms the narrow side with the cutting edge, while the other two sides of the triangle come together to the holding portion and the through opening is arranged in the triangle.

The holding portion can extend lengthwise tongue-like from the cutting portion in opposite relationship to the cutting direction. In that way the blade can be of a substantially Y-shaped contour. Accordingly the blade and the spacer element may be of the same contour shape. The blade and the spacer element in the working position of the spacer element may be placed in mutually superposed coincident relationship except for the rear narrow side of the blade with the cutting edge and can be applied flat against each other on the join plane or in the receiving means thereof. In that case the blade may have only the additional central region with cutting edge.

The holding portion can have holding elements for holding the blade in a blade receiving means, wherein the blade receiving means can involve one of the above-described embodiments. The holding elements can have a securing slot which is introduced at the end in the holding portion and extends lengthwise in the cutting direction. In addition the holding elements can be in the form of recesses as already described hereinbefore.

The cutting edge can have a cutting edge portion arranged in one of the blade side surfaces or spaced relative to the blade side surfaces. Preferably the cutting edge portion is arranged eccentrically with respect to a blade thickness. If the cutting edge portion is arranged in one of the blade side surfaces, the blade is ground from one side. If the cutting edge portion is arranged spaced relative to the blade side surfaces then the blade is ground at both sides. The cutting edge portion can be arranged eccentrically with respect to a height of the narrow sides, that is to say spaced unequally from the side surfaces of the blade. In that way the cutting edge portion of the blade can be screened and thus the procedure with the blade can be less dangerous. The eccentric arrangement of the cutting edge portion means that it can be correspondingly displaced over the substrate at two different spacings. In that way projecting portions can also be planed off in three cutting steps, by the blade cutting off the projecting portions to residual cutting portions in a first step in the spaced position. In a second step the blade in the contact position but with the cutting edge spaced relative to the substrate can further cut or plane off the residual projecting portions. In a third step the blade can be used turned through 180° in the contact position in such a way that its cutting edge portion bears against the substrate or is only still slightly spaced therefrom so that the residual projecting portions can be completely planed off. The spacer element can also come into use only when higher residual projecting portions than those which can be achieved by the eccentric cutting edge are wanted. The cutting edge portion is preferably arranged parallel to the side surfaces.

The eccentric cutting edge portion can be spaced at a spacing a relative to the blade side surface and at a spacing b relative to the other blade side surface. The ratio of the spacings a/b can be less than 1, preferably less than or equal to 1/2 and greater than or equal to 1/10. Due to the spacing of the cutting edge from the blade side surfaces, the blade can be used twice for smoothing off a projecting portion, insofar as, with the one blade side surface as the side surface facing towards the floor covering, the blade leaves behind a smaller residual projecting portion that protrudes above the surface of the floor covering, than when cutting the weld seam with the other blade side surface as the lower side surface that is towards the floor covering.

The cutting edge is preferably arranged in the lower blade side surface in the position of use. In that way projecting portions of the substrate can be cut off to close to its surface by means of the blade.

By means of the join plane in accordance with one of the above-described embodiments and/or the blade in accordance with one of the above-described embodiments, a substrate can be smoothed off or planed off. For that purpose the join plane can have a spacer element which is arranged in variable-position relationship on the join plane and which is movable between a working position for holding the blade in the spaced position and a readiness position for holding the blade in the receiving means in a contact position in which the blade for processing the substrate can be caused to bear against the substrate at least with a region having the cutting edge. For that purpose the following method steps can be implemented:

- first step of smoothing the substrate, wherein the spacer element is positioned in the working position and the blade is held by means of the spacer element in the spaced position in such a way that the projecting portions on the substrate are cut off to leave residual projecting portions,
- a step of moving and in particular pivoting or displacing the spacer element from the working position into the readiness position in which the blade can be guided over the surface without a spacing therefrom, and
- a second step of smoothing wherein the residual projecting portions are cut off the substrate by means of the blade.

Preferably the blade is cuttingly operative in a cutting plane parallel to or in the surface of the substrate. The blade can be flexibly bent about a bend axis perpendicularly to the cutting direction for example by means of pressing against the substrate. The blade can be bent in such a way that it is arranged in parallel spaced relationship with the substrate in the spaced position with a region which is at the rear in the cutting direction and which has a cutting edge of the blade, and bears flat against the substrate with the region in the contact position. Likewise the spacer element can also be flexibly bent for example in the working position by means of pressing against the substrate about the bending axis, perpendicularly to the cutting direction. In that way the blade and the spacer element can be so arranged relative to each other in the spaced position that unbent and bent flexibly about the bend axis they are positioned parallel to each other and bearing against each other in the join plane.

Flexing of the blade and/or of the spacer element can be limited by an abutment. That ensures that in its spaced position and also in its contact position the blade can be positioned in an optimum bend position and thus in an optimum cutting position relative to the substrate and that optimum bend position can be retained over the displacement of the join plane over the substrate without corrections for example by pressing the blade against the substrate with a greater or reduced force being necessary for that purpose.

Then the spacer element can be moved back again into its working position and in particular pivoted or pushed back thereinto. In that way the join plane is ready for use again for a further operation of cutting off projecting portions. Furthermore with the spacer element in that position the blade can be most effectively protected in the receiving means so that the join plane can be best stored in that condition.

Figure 2:
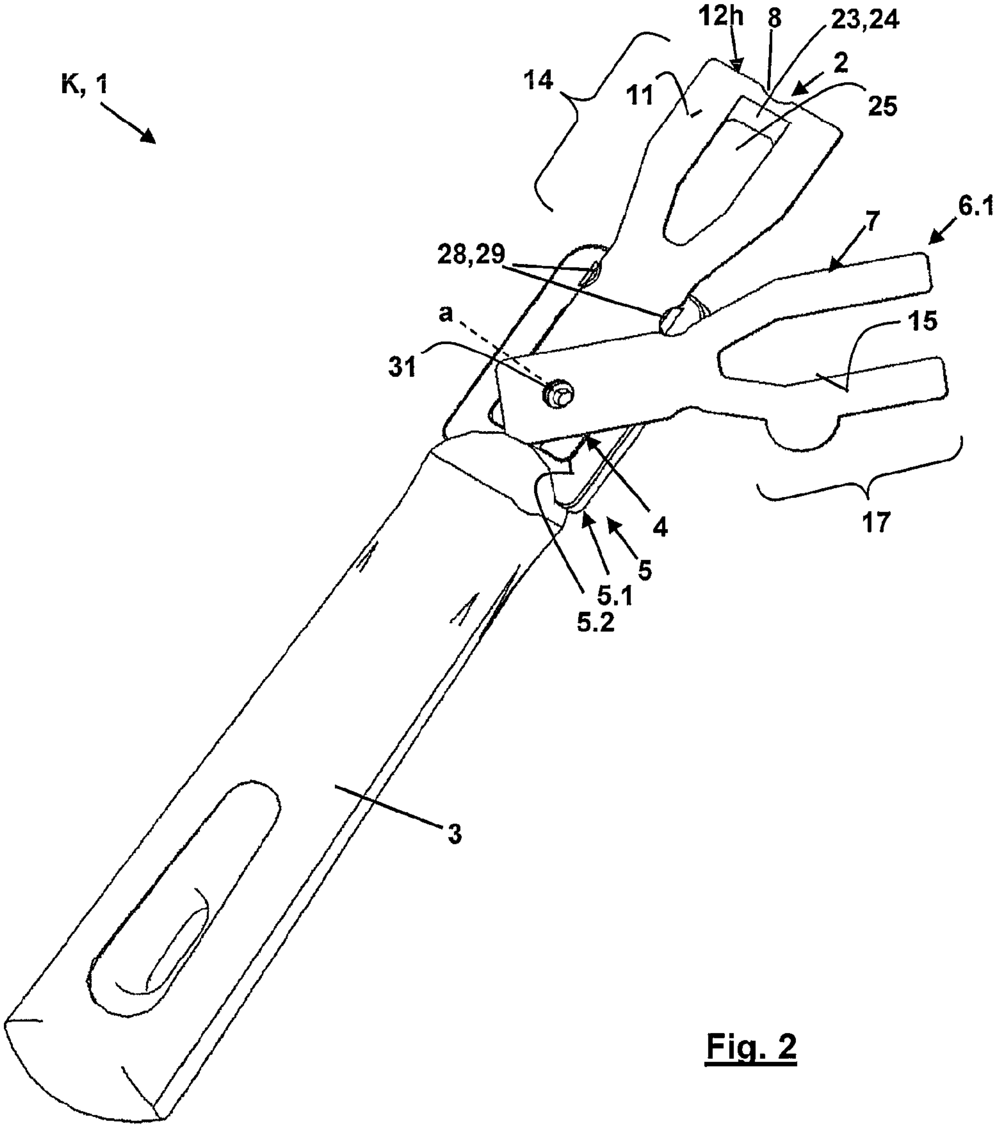
Figure 3:
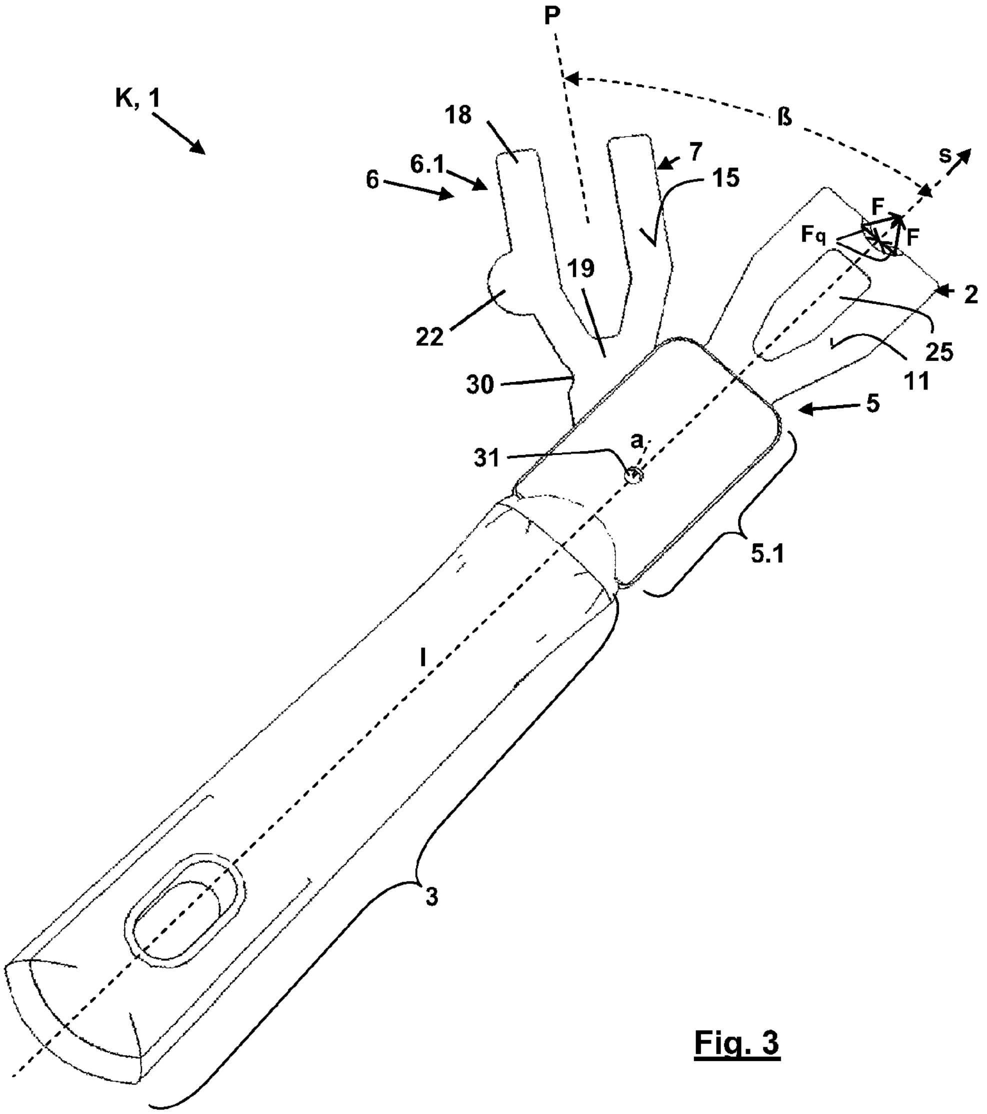
Figure 7A:
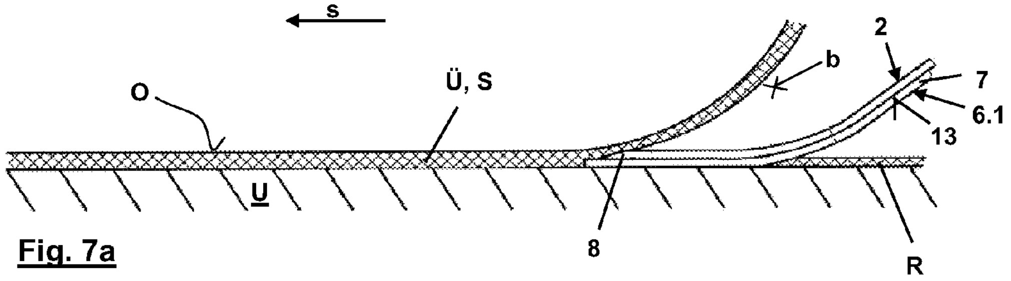
Figure 7B:
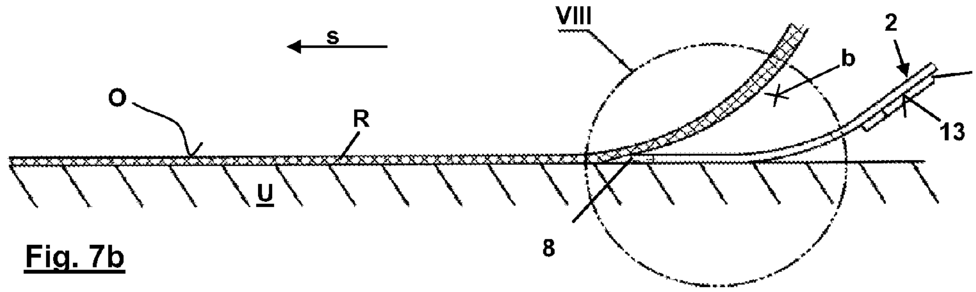
Figure 8:
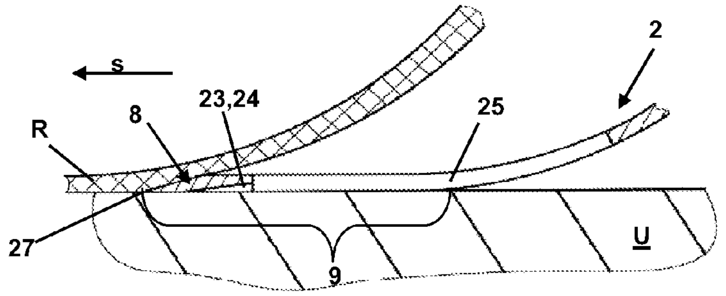
Figure 10:
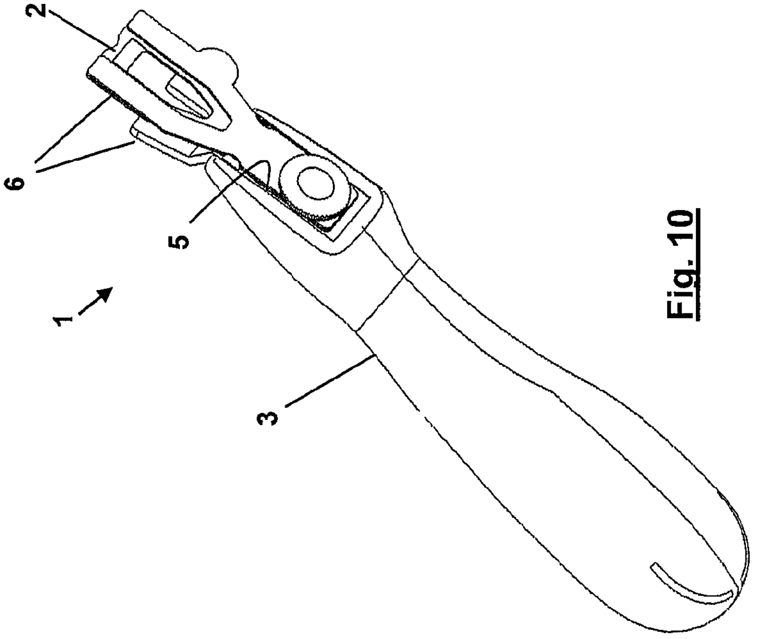
Figure 9:
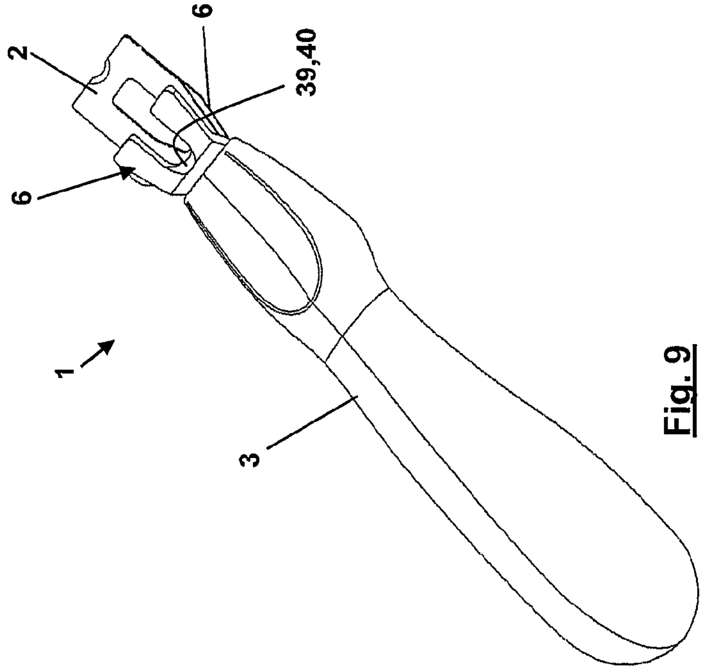
Figure 12:
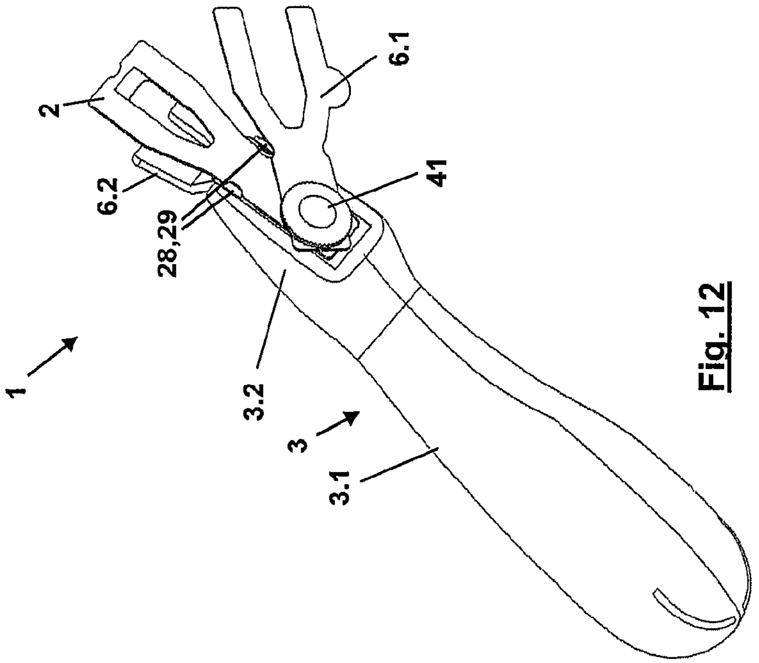
Figure 11:
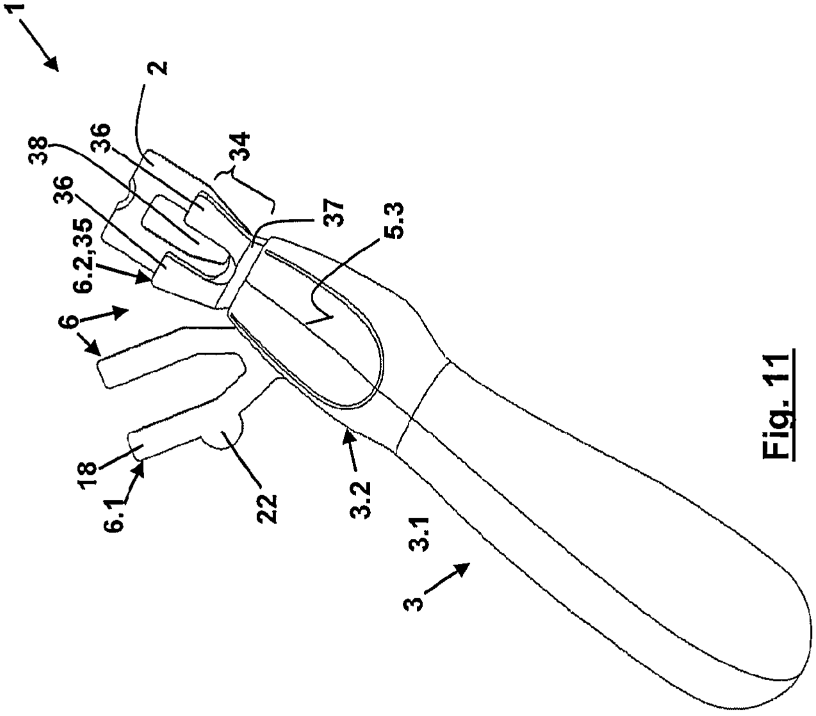

The present invention is described in greater detail hereinafter by means of an embodiment by way of example illustrated in a drawing in which:

FIG. 1 shows a perspective view from below of a join plane with blade and with a spacer element in a working position, FIG. 2 shows a perspective view from below of a join plane with the blade and with the spacer element in a readiness position, FIG. 3 shows a perspective view from above on to the join plane with the blade and with the spacer element in the readiness position, FIG. 4 shows a plan view of the blade of FIGS. 1 through 3, FIG. 5 shows a view from below of the blade of FIG. 4, FIG. 6*a* shows a side view of the blade of FIG. 4, FIG. 6*b* shows a sectional view taken along line A-A in FIG. 4, FIG. 7*a* shows a sectional view of a floor covering with weld seam and a side view of a front portion of the join plane with inserted blade and spacer element in a bend position in the first step of smoothing off the weld seam, FIG. 7*b* shows a sectional view of the floor covering with the weld seam which is smoothed off to afford a residual projecting portion and a side view of the front portion of the join plane with bent inserted blade in the contact position and the pivoted spacer element in the readiness position in the second step of smoothing off the weld seam, FIG. 8 shows a detail view X in accordance with the part X shown in FIG. 7*b*, the blade being shown as a longitudinal view in section, FIG. 9 shows a perspective plan view of a further embodiment of the join plane with the spacer element in the working position, FIG. 10 shows a perspective view from below of the embodiment of the join plane of FIG. 9, FIG. 11 shows a perspective plan view of the embodiment of the join plane of FIG. 9 with the spacer element in the readiness position, FIG. 12 shows a perspective view from below of the embodiment of the join plane of FIG. 11, and FIGS. 13 and 14 in the same manner as FIGS. 7 and 8 show views to demonstrate the displacement of the join plane over a substrate, but here with the embodiment of the join plane shown in FIGS. 9 through 12.

FIGS. 1 through 4 and 9 through 12 show two embodiments of a blade holder K which here is in the form of a join plane 1, with an inserted blade 2, as a perspective view from below and a perspective view from above, while FIGS. 5 through 6 by way of example show the blade 2 in itself in various views. FIGS. 7 through 8 and 13 through 14 respectively demonstrate a method of smoothing and planing off a surface O of a substrate U, that is to say here a weld seam S as a projecting portion Ü, by means of two method steps which are diagrammatically illustrated here.

Figure 13A:
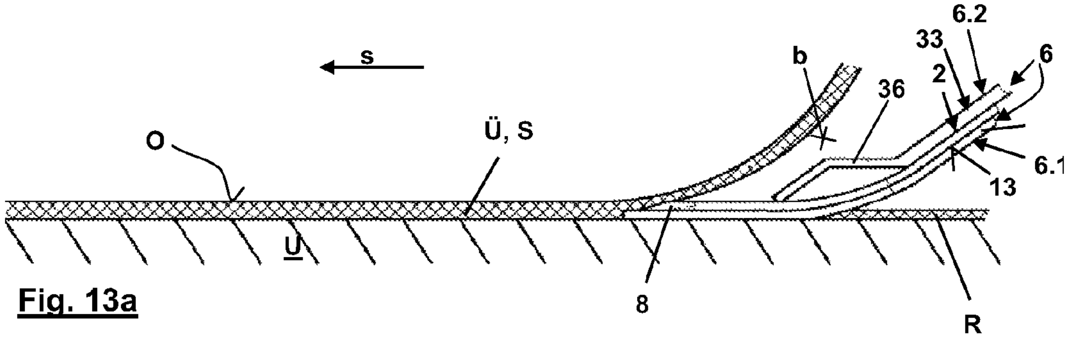

The join plane 1 has a handle 3 having a handle grip 3.1, a receiving means 5 including a receiving space 4 for the blade 2 for fixing the blade 2 to the join plane 1, and a positioning aid 6 for positioning the blade 2 relative to the substrate U on a spacer device 6.1. The positioning aid 6 includes a spacer device 6.1 having a spacer element 7, by means of which the blade 2 can be positioned in the receiving means 5 in a spaced position shown in FIGS. 1, 7*a*, 9, 10 and 13*a*, in such a way that the blade 2 can be positioned with its cutting edge 8 spaced in relation to the substrate U for processing a substrate U or for smoothing off the weld seam S, in such a way that it is displaceable on the substrate U in a cutting direction s parallel to the surface O thereof. The latter is shown in FIG. 7*a*. As shown in FIGS. 7 and 13 the blade 2 and the spacer element or alone the blade 2 are flexibly bent for the cutting operation about a bend axis b parallel to the substrate U and perpendicularly to the cutting direction s, in such a way that at the end they bear directly or indirectly flat against the substrate U.

The spacer element 7 is arranged variably in position relative to the receiving means 5 on the join plane 1. In this case the spacer element 7 is movable between a working position shown in FIGS. 1 and 7*a* for holding the blade 2 in the spaced position and a readiness position shown in FIGS. 2 and 3 for holding the blade 2 in the receiving means 5 in a contact position. In the contact position the blade 2, as can be seen in particular from FIGS. 7*b* and 8, for working on the substrate U or for smoothing off the weld seam S, is applied against the substrate U just above the surface O of the substrate U, with a region 9 having the cutting edge, in such a way that the cutting direction s is parallel to the substrate U.

As can be clearly seen in particular from FIGS. 4 through 6 the blade 2 has a flat blade body 10 with large blade side surfaces 11 and narrow sides 12 connecting the blade side surfaces 11, wherein the cutting edge is arranged at the narrow side 12*h* which is at the rear in the cutting direction s. The receiving means 5 has a receiving portion 5.1 which is arranged fixedly on the join plane 1 and adjoins the handle grip 3.1. The receiving portion 5.1 includes a receiving surface 5.2 which defines the receiving space 4 and against which the blade 2 bears with a blade side surface 11. Thus the blade 2 is safely and securely arranged in the receiving space 4 between the receiving surface 5.2 and the spacer element 7. The spacer element 7 is arranged variably in position about a pivot axis a perpendicularly to the receiving surface 5.2 on the join plane 1.

As can be seen in particular from FIG. 1 the spacer element 7 in its working position covers over the receiving space 4 at an underside 13 shown in FIGS. 7*a* and *b* in the cutting direction s to such an extent that the blade 2 positioned in the receiving space 4 only projects with a part of its cutting edge 8 in the cutting direction s. In FIG. 2 the spacer element 7 is pivoted out of the working position into the readiness position in which it opens the receiving space 4 at its underside 13 to such an extent that a cutting edge portion 14 with the region 9 at the rear in the cutting direction, is unconcealed downwardly for bearing against the substrate U in the position of use of the join plane 1 shown in FIGS. 7 and 8. In that way the region 9, as shown in FIG. 7, can be applied directly against the substrate U in a flat condition, with bending of the blade 2.

The spacer element 7 is of a flat elongate shape with a large side surface 15, wherein the pivot axis a is arranged perpendicularly to the large side surface 15 in an end portion, in the form of a holding portion 16, of the spacer element 7. Thus the spacer element 7 is pivotable parallel to the receiving surface 5.2 or parallel to the blade side surfaces 11 of the blade 2 received in the receiving means 5. The blade 2 and the spacer element 7 also lie flat in the working position of the spacer element 7 and in the readiness position of the spacer element 7, that is to say the spacer element 7 delimits the receiving space 4 downwardly. The blade is supported downwardly by means of the spacer element 7. In this arrangement the spacer element 7 in its working position (FIG. 1) projects with an end in the form of a support portion 17, to support the blade 2, in the cutting direction, beyond the receiving means 5. In addition in respect of their outside contour except for the rear narrow side 12*h* of the blade 2 the spacer element 7 and the blade 2 are of a substantially congruent configuration. In that way the blade 2, except for the central region of the rear narrow side 12*h* with the cutting edge 8, is supported downwardly in the working position of the spacer element 7 over its entire longitudinal extent and is thus held stably in position in the receiving means 5.

The spacer element 7 and the blade 2 are of such a nature in respect of their flexibility that, as shown in FIGS. 7*a* and 7*b*, they are flexibly bendable about a bend axis b perpendicularly to the pivot axis a and perpendicularly to the cutting direction s.

In the readiness position (FIGS. 2 and 3) the spacer element 7 is pivotably arranged at an angle $\beta>0°$ relative to the cutting direction s in such a way that its support portion 17 projects laterally from the receiving space 4. With the position shown here, the angle β is about 40°, while the spacer element 7 can be pivoted still further through about a total of 140°. The spacer element 7 and the blade 2 are of an elongate shape with an approximately U-shaped contour, wherein the spacer element 7 includes two limbs 18 which extend in the cutting direction s in the working position and form the support portion 17. They both have a transverse leg 19 which further extends tongue-like in opposite relationship to the cutting direction s. In the case of the blade 2, the transverse leg 19 forms a holding portion 20 while in the case of the spacer element 7 it forms the holding portion 16. As a departure from the shape of the spacer element 7, the blade 2, in respect of its cutting portion 14, has an approximately triangular contour with a side 23 of the triangle which is at the rear in the cutting direction and which includes the rear narrow side 12*h* with the cutting edge 8, while the two other sides 21 of the triangle converge to the holding portion 20. The blade 2 and the spacer element 7 are of a mirror-image symmetrical configuration with a central longitudinal sectional plane P, having the pivot axis a, as the plane of mirror-image symmetry, in which case in regard to the spacer element 7 there is provided an additional handling portion 22 which is mounted laterally to a limb 18 and which breaks the mirror-image symmetry of the spacer element 7 at that point.

As a feature of particular emphasis, the blade 2 has a relief ground configuration 23 with a recess 24 and a through opening 25, wherein the undercut configuration 23 with the recess 24 opens in opposite relationship to the cutting direction s laterally into the through opening 25. The relief ground configuration begins in opposite relationship to the cutting direction at a small spacing 26 relative to the cutting edge portion 27 of the cutting edge 8. As shown in FIG. 8 the recess 24 moves downwardly in a straight line towards the through opening 25. The through opening 25 is of a slot-like configuration in respect of its cross-section as it extends lengthwise in the cutting direction s. The relief ground configuration 23 and the through opening 25 reduce static and sliding friction of the blade 2 when it is guided over the substrate U with contact of its cutting portion 14 over the substrate 2.

The cutting edge 8 is of a sickle-shaped configuration. When cutting off the projecting portion Ü in the cutting direction s of the blade 2, cutting forces F occur, having a force component $F_q$ transversely relative to the cutting direction s towards the blade 2. If the blade 2 is guided exactly in the cutting direction s, that is to say in the longitudinal direction I of the blade 2 or the join plane 1, the force component $F_q$ centrally of the cutting edge 8 is equal to zero and increases approximately sinusoidally at both sides towards the edges of the cutting edge. Because of the mirror-image symmetry of the blade 2 and thus the cutting edge 8 the force components $F_q$ cancel each other out. If however the join plane is guided in such a way that the longitudinal direction forms an angle greater than zero with the cutting direction, the force components and the force components in the cutting direction on both sides are unequal and are added to afford a force which is referred to as a correction force which acts on the side towards which the blade holder K or the join plane is guided in pivoted relationship with respect to the cutting direction s. That causes an increased resistance to cut at that side and thus at the same time an almost automatic correction such that the join plane and thus the blade are urged back with their longitudinal axes into the cutting direction.

For further fixing the blade 2 and the spacer element 7 in the working position, provided at the receiving means 5 are latching elements 28 which laterally delimit the receiving space 4 and against which the blade 2 and the spacer element 7 laterally bear. The leaf springs 29 are guided in mutually opposite relationship at the same height with respect to the longitudinal direction I of the blade 2 and the join plane 1 and spaced in the cutting direction s relative to the pivot axis a so that those three points define a triangle (not shown here). The latching elements 28 are in the form of leaf springs 29 which hold the blade 2 fast in a clip-like fashion in the contact position and the blade 2 and the spacer element 7 in the working position on the receiving means 5. For the sake of better fixing, provided laterally on the blade 2 and the spacer element 7 are recesses 30 into which the latching elements 28 fixingly engage.

From a side surface, that faces towards the receiving means 5 and that is shown here as concealed, of the holding portion 16 of the spacer element 7, there is a rotary pin 31 providing the pivot axis a, for forming the pivotal connection of the spacer element 7 to the receiving means 5. The rotary pin 31 extends, which is concealed in the drawing, through the receiving space 4 and is rotationally movably supported at an opposite upper side wall of the receiving means 5, that delimits the receiving space 4.

As can be seen from FIGS. 4 through 6 the blade 2 has an end securing slot 32 into which the blade 2 engages for mounting and fixing thereof in the receiving means 5 with the rotary pin 31. In that way the blade 2 can be pushed into the receiving space 4 in opposite relationship to the cutting direction s, in which case the leaf springs 29 elastically spread and upon reaching the recesses 30 latch thereinto. Upon pivotal movement from the working position into its readiness position the spacer element 7 is guided laterally over one of the leaf springs 29 which correspondingly elastically yields.

FIG. 7*a* shows the first step of smoothing off the substrate U, wherein the spacer element 7 is positioned in the working position and the blade 2 is held by means of the spacer element 7 in the spaced position in such a way that the weld seam S is cut away except for a residual projecting portion R. In FIG. 7*b*, in a second step of smoothing off the substrate U, the blade 2 is passed over the substrate U without a spacing from the surface O thereof, the residual projecting portion R being cut off. It can be clearly seen from FIG. 8 that the cutting edge 27 bears directly against the substrate U and the relief ground configuration 23 produces the recess 24 which is further deepened in a straight line in opposite relationship to the cutting direction s and opens into the through opening 25.

FIGS. 11 through 14 show a further embodiment of the join plane 1 and the mode of operation thereof.

In addition the handle grip 3.1 is more greatly ergonomically adapted to the inside of the hand (not shown) with its rounded configurations of the user (not shown here) so that the handle grip 3.1 can be securely supported in the inside of the hand in the cutting direction s. In addition in the position of use of the join plane 1 the handle 3, with a projection 3.2, overlaps the receiving portion 5.1 at the top side, thereby providing improved protection for the blade 2. For more easily guiding the planed-off cuttings away, the sliding-off surface 5.3 at the top side is so inclined relative to the longitudinal axis I that it forms an acute angle with the cutting direction s. The surface 5.3 is also of a slightly concavely curved configuration towards its center.

Figure 13B:
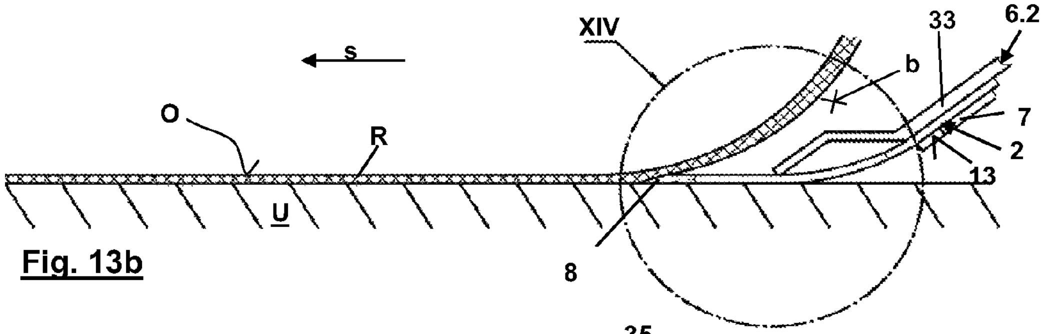
Figure 14:
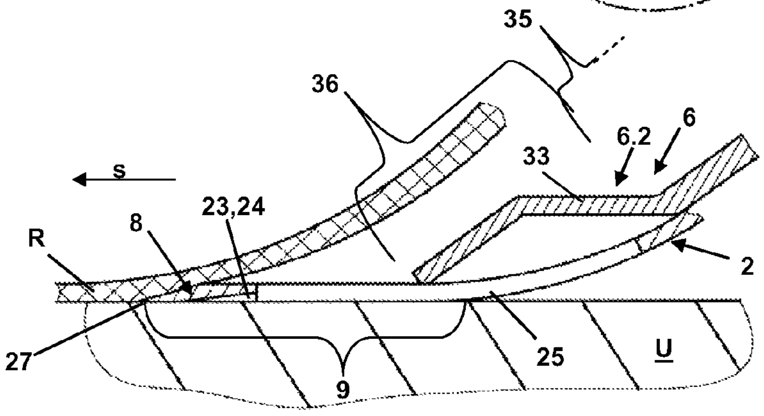

In the embodiment which is shown in FIGS. 9 through 12 on its own and in cutting use in FIGS. 13 and 14, of the blade holder K in the form of a join plane 1, the positioning aid 6 additionally includes an abutment device 6.2. The abutment device 6.2 has an abutment element 33 for positioning the blade 2 and/or the spacer element 7 in a given bend position. The blade 2 and the spacer element 7 are shown in that bend position in FIG. 13*a* and the blade 2 is shown in the bend position in FIG. 13*b*. As already described in relation to the first embodiment of the join plane with reference to FIGS. 1 through 3 and FIGS. 7 and 8, the blade 2 and the spacer element 7 are flexibly bendable about the bend axis b so that in the bend position they can bear directly or indirectly at the end flat against the substrate and the cutting edge 8 can be correspondingly guided parallel to the surface O of the substrate over same. By means of the abutment element 33, bending is limited to a given degree insofar as the blade 2 fitted into the receiving space 4 is pressed against the abutment element with its end being placed on the substrate U, and is held there as long as the blade remains pressed sufficiently firmly against the substrate U. Therefore the abutment element 33 predetermines an optimum bend position for the blade 2, wherein the receiving space 4 in the bend position, in the position of use of the join plane 1, is delimited by the abutment element 33, at the side remote from the substrate U.

The abutment element 33 is of a cranked configuration. It has an abutment end 34 and a securing end 35. It extends with the abutment end 34 with a component of movement in the cutting direction s towards the receiving space 4. For that purpose it arcuately engages the side of the receiving space 4, that is remote from the spacer element 7, for delimiting same. The abutment end 34 is of a U-shaped configuration with abutment limbs 36 which are mirror-image symmetrical relative to the longitudinal axis I and a transverse leg 37, the crank configuration being at the transverse leg 37. The abutment limbs 36 extend towards the receiving space 4 and delimit same in the bend position. Accordingly the blade 2 bears against two points in the bend position and can thus be held in the receiving means 5 in non-tipping relationship with respect to the longitudinal axis I.

The abutment limbs 36 and the transverse leg 37 delimit an intermediate space 38 for carrying away cut-off pieces (not shown here). In this case the side wall 39 which faces in the cutting direction s and which delimits the intermediate space 38 is provided with an inclined surface portion 40 over which the cuttings can more easily slide out of the intermediate space 38.

Similarly to the blade 2 the abutment element 33 has a securing slot which is concealed in the drawing and by means of which the abutment element 33 can be pushed into the receiving means 5 in opposite relationship to the cutting direction s. The abutment element 33, the blade 2 and the spacer element 7 are held by the rotary pin (concealed here), wherein a knurled screw 41 engaging axially into the rotary pin permits rapid loosening and replacement of the abutment element 33, the blade 2 and/or the spacer element 7. In addition in this case also the latching elements 28 provide a lateral hold.

In this embodiment as shown in FIGS. 9 through 12 the projection 3.2 of the handle 3 engages in the cutting direction s far beyond the receiving means 5 and forms the sliding-away surface 5 which adjoins the transverse leg 37. In that way at the same time the abutment element 33 is stabilised in its mounting in the receiving means 5. In addition the projection 3.2 laterally embraces the receiving means 5, thereby improving the positional stability of the blade 2 and the abutment element 33. In addition the blade 2 is correspondingly covered which increases working protection.

The views in FIGS. 13 and 14 are the same as those in FIGS. 7 and 8. These involve diagrammatic illustrations in which lateral components of the join plane, which interfere with the view, have been omitted. As a departure from the views in FIGS. 7 and 8, FIGS. 13 and 14 additionally show the abutment element 33 of the abutment device 6.2, in relation to which the blade 2 and the spacer element 6.1 in FIG. 13*a* or the blade 2 on its own in FIGS. 13*b* and 14 are bent about the bend axis b perpendicularly to the plane of the drawing into the bend position. That permits given optimum bending of the blade during the cutting operation.

LIST OF REFERENCES

1 join plane
2 blade
3 handle
3.1 handle grip
3.2 projection
4 receiving space
5 receiving means
5.1 receiving portion
5.2 receiving surface
5.3 sliding-away surface
6 positioning aid
6.1 spacer device
6.2 abutment device
7 spacer element
8 cutting edge
9 region
10 blade body
11 blade side surface
12 narrow side
12*h* narrow side
13 underside
14 cutting portion
15 side surface
16 holding portion
17 support portion
18 limb
19 transverse leg
20 holding portion
21 side of a triangle
22 handling portion
23 relief ground configuration
24 recess
25 through opening
26 spacing
27 cutting edge
28 latching element
29 leaf spring
30 recess
31 rotary pin
32 securing slot
33 abutment element
34 abutment end
35 securing end
36 abutment limb
37 transverse limb
38 intermediate space
39 side wall
40 inclined surface portion
41 knurled screw
a pivot axis
b bend axis
l longitudinal axis
s cutting direction
F cutting force
$F_q$ force component
K blade holder
R residual projecting portion
S weld seam
U substrate
Ü projecting portion
β angle
O substrate surface
P central longitudinal sectional plane

What is claimed is:

1. A blade holder for smoothing and planing off a substrate comprising:

a handle, a working end having a receiving means including a receiving space for a blade for fixing the blade to the blade holder, wherein the blade has a cutting edge, and a positioning aid for positioning the blade holder relative to the substrate, wherein the positioning aid includes a spacer device, by means of which the blade can be arranged in a spaced position in the receiving means in such a way that it can be positioned in spaced relationship with the substrate with its cutting edge for processing the substrate, characterised in that the spacer device has a spacer element, the spacer element is arranged in positionally variable relationship with the receiving means on the blade holder and the spacer element is movable between a working position for holding the blade in the spaced position and a readiness position for holding the blade in the receiving means in a contact position in which the blade can be placed against the substrate for processing same at least with a region having the cutting edge; and;

characterised in that the spacer element in its working position covers over the receiving space at an underside which in the position of use of the blade holder is towards the substrate and in a cutting direction, that the blade positioned in the receiving space remains unconcealed only in a cutting portion having the cutting edge, and that the spacer element in its readiness position opens the receiving space at its underside to such an extent that at least the part of the receiving space, that is provided for the region having the cutting edge, is open downwardly in the position of use of the blade holder.

2. The blade holder as set forth in claim 1 characterised in that the receiving means has a receiving portion with a receiving surface and the receiving space is of such a configuration that it provides for holding the blade with a blade side surface at the receiving surface in the receiving space.

3. The blade holder as set forth in claim 2 characterised in that the spacer element is arranged variably in position in parallel relationship with the receiving surface with respect to the receiving means on the blade holder.

4. The blade holder as set forth in claim 3 characterised in that the spacer element is of an elongate shape with a Y-shaped contour, wherein the spacer element includes two limbs which extend in the working position in the cutting direction and form a support portion, and a transverse leg which connects the limbs and forms the holding portion.

5. The blade holder as set forth in claim 2 characterised in that the spacer element is arranged pivotably movably with a pivot axis perpendicularly to the receiving surface at the blade holder.

6. The blade holder as set forth in claim 5 characterised in that the spacer element is of a flat elongate shape with a large side surface and that the pivot axis is arranged perpendicularly to the large side surface in an end portion of the spacer element, that is in the form of a holding portion.

7. The blade holder as set forth in claim 6 characterised in that the spacer element extends in the plane of its large side surface and perpendicularly to the cutting direction at least to a lateral boundary delimiting the receiving space.

8. The blade holder as set forth in claim 1 characterised in that in the working position the spacer element projects beyond the receiving means with an end in the form of a support portion for supporting the blade in the cutting direction.

9. The blade holder as set forth in claim 8 characterised in that the spacer element is such that in the working position it is flexibly bendable into a bend position under a pressure loading acting on the support portion in the direction of the pivot axis in a direction towards the receiving space at least with its support portion about a bend axis perpendicularly to the pivot axis and perpendicularly to the cutting direction.

10. The blade holder as set forth in claim 9 characterised in that the support portion in the bend position can be caused to bear flat against the substrate at least with a holding portion of the spacer element.

11. The blade holder as set forth in claim 8 characterised in that in the readiness position the support portion clears the receiving space at its underside completely or substantially.

12. The blade holder as set forth in claim 8 characterised in that the spacer element in the readiness position is arranged pivoted at an angle β of greater than zero relative to the cutting direction in such a way that its support portion projects laterally out of the receiving space.

13. The blade holder as set forth in claim 1 characterised in that the positioning aid includes an abutment device for the blade and/or the spacer element, by means of which the blade which can be fitted into the blade holder and/or the spacer element can be held in a given bend position relative to the substrate.

14. The blade holder as set forth in claim 13 characterised in that the abutment device has an abutment element which delimits the receiving space in the bend position in the position of use of the blade holder at the side remote from the substrate.

15. The blade holder as set forth in claim 14 characterised in that the abutment element is fixed with a securing end to the blade holder and extends with an abutment end with a travel component in the cutting direction towards the receiving space.

16. The blade holder as set forth in claim 15 characterised in that the abutment end is of a U-shaped configuration with two abutment limbs extending towards the receiving space.

17. The blade holder as set forth in claim 13 characterised in that the abutment element is variable in length.

18. The blade holder as set forth in claim 1 characterised in that the blade holder has an elongate body providing the working end having the receiving means and the handle in the form of a handle grip, the spacer element is pivotably movably arranged at the working end and the cutting direction is arranged in the longitudinal direction of the body in a rest position of the blade holder in which the blade holder is mechanically unloaded.

19. The blade holder as set forth in claim 18 characterised in that in the working position of the spacer element it is substantially of a minor-image symmetrical relationship with a central longitudinal sectional plane, having the pivot axis, as a mirror-image symmetry plane.

20. The blade holder as set forth in claim 1 characterised in that the spacer element can be fixed in the working position.

21. The blade holder as set forth in claim 20 characterised in that provided at the receiving means are latching elements laterally delimiting the receiving space and the latching elements bear laterally against the spacer element in the working position thereof.

22. The blade holder as set forth in claim 1 characterised in that the spacer element has a handling portion projecting laterally on the support portion for its manual actuation.

23. The blade holder as set forth in claim 1 further comprising a blade wherein the blade has a flat blade body with large blade side surfaces and narrow sides connecting the blade side surfaces, and the cutting edge arranged at a front side of the blade in the cutting direction, characterised by a relief ground configuration which is provided into the blade side surface that is towards the substrate in the working position of the blade, wherein the relief ground configuration has a recess in said blade side surface.

24. The blade holder as set forth in claim 23 characterised in that the recess adjoins the cutting edge directly in the cutting direction or spaced by a small distance relative to the cutting edge.

25. The blade holder as set forth in claim 24 characterised in that the blade is of an elongate shape with a cutting portion having the cutting edge and a holding portion.

26. The blade holder as set forth in claim 23 characterised in that the recess increases in opposite relationship to the cutting direction.

27. The blade holder as set forth in claim 23 characterised in that a through opening is provided perpendicularly to the blade side surface.

28. The blade holder as set forth in claim 27 characterised in that the relief ground configuration with the recess opens laterally into the through opening.

29. The blade holder as set forth in claim 28 characterised in that the cutting edge is sickle-shaped and introduced concavely into the blade body.

30. The blade holder as set forth in claim 23 characterised in that the cutting edge is arranged in respect of its longitudinal extent transversely and in mirror-image symmetrical relationship with the cutting direction in a central portion of the front side.

31. The blade holder as set forth in claim 30 characterised in that the central region with the cutting edge is arranged displaced by an amount in opposite relationship to the cutting direction from the front side into the blade body.

32. The blade holder as set forth in claim 30 characterised in that the holding portion extends lengthwise tongue-like from the cutting portion in opposite relationship to the cutting direction and has holding elements for holding the blade in a blade receiving means.

33. The blade holder as set forth in claim 32 characterised in that the holding elements have a securing slot which is introduced at the end into the holding portion and extends lengthwise in the cutting direction.

34. The blade holder as set forth in claim 23 characterised in that the blade is of a mirror-image symmetrical construction with respect to a central longitudinal axis extending in the cutting direction and the cutting portion is of a substantially triangular shape, wherein a portion of the triangle forms the front side with the cutting edge and the two other sides of the triangle converge to the holding portion and the through opening is arranged in the triangle.

35. The blade holder as set forth in claim 23 characterised in that the cutting edge has a cutting edge portion arranged in one of the blade side surfaces or spaced relative to the blade side surfaces.

36. The blade holder as set forth in claim 35 characterised in that the cutting edge portion is arranged in the blade side surface that is the lower surface in the position of use.

37. A method of smoothing off and planing a surface of a substrate comprising:

providing a blade holder, wherein the blade holder comprises a handle, a working end having a receiving means including a receiving space for a blade for fixing the blade to the blade holder, wherein the blade has a cutting edge, and a positioning aid for positioning the blade holder relative to the substrate, wherein the positioning aid includes a spacer device, by means of which the blade can be arranged in a spaced position in the receiving means in such a way that it can be positioned in spaced relationship with the substrate with its cutting edge for processing the substrate, characterized in that the spacer device has a spacer element which is arranged in positionally variable relationship within the receiving means on the blade holder and is movable between a working position for holding the blade in the spaced position and a readiness position for holding the blade in the receiving means in a contact position in which the blade can be placed against the substrate for processing same at least with a region having the cutting edge, and characterised in that the spacer element in its working position covers over the receiving space at an underside which in the position of use of the blade holder is towards the substrate and in a cutting direction, that the blade positioned in the receiving space remains unconcealed only in a cutting portion having the cutting edge, and that the spacer element in its readiness position opens the receiving space at its underside to such an extent that at least the part of the receiving space, that is provided for the region having the cutting edge, is open downwardly in the position of use of the blade holder;

smoothing off the substrate in a first step, wherein the spacer element is positioned in the working position and the blade is held by means of the spacer element in the spaced position in such a way that projecting portions on the substrate are cut off except for residual projecting portions, pivoting the spacer element out of the working position into the readiness position in which the blade can be guided over the surface without a spacing therefrom, and smoothing off the substrate in a second step, wherein the residual projecting portions are cut off the substrate by means of the blade.

38. A method as set forth in claim 37 characterised in that the blade is flexibly bent for smoothing off the substrate by means of being pressed against the substrate about a bend axis perpendicularly to the cutting direction in such a way that in the spaced position it is arranged in parallel spaced relationship with the substrate and which has the cutting edge and in the contact position it bears with the cutting region flat against the substrate.

39. A method as set forth in claim 37 characterised in that after the second smoothing step the spacer element is moved or pivoted back from the readiness position into the working position.

* * * * *

UNITED STATES PATENT AND TRADEMARK OFFICE

CERTIFICATE OF CORRECTION

PATENT NO. : 8,458,915 B2
APPLICATION NO. : 12/809801
DATED : June 11, 2013
INVENTOR(S) : Christoph Wahl It is certified that error appears in the above-identified patent and that said Letters Patent is hereby corrected as shown below:

In the Claims:

In column 20, line 13, delete “minor-image” and insert -- mirror-image --, therefor.

Signed and Sealed this
Seventeenth Day of September, 2013

Teresa Stanek Rea
*Deputy Director of the United States Patent and Trademark Office*